Sept. 5, 1950 M. BOERSTRA 2,521,334
DEVICE FOR TREATING LIQUIDS AND EMULSIONS
Filed July 11, 1946
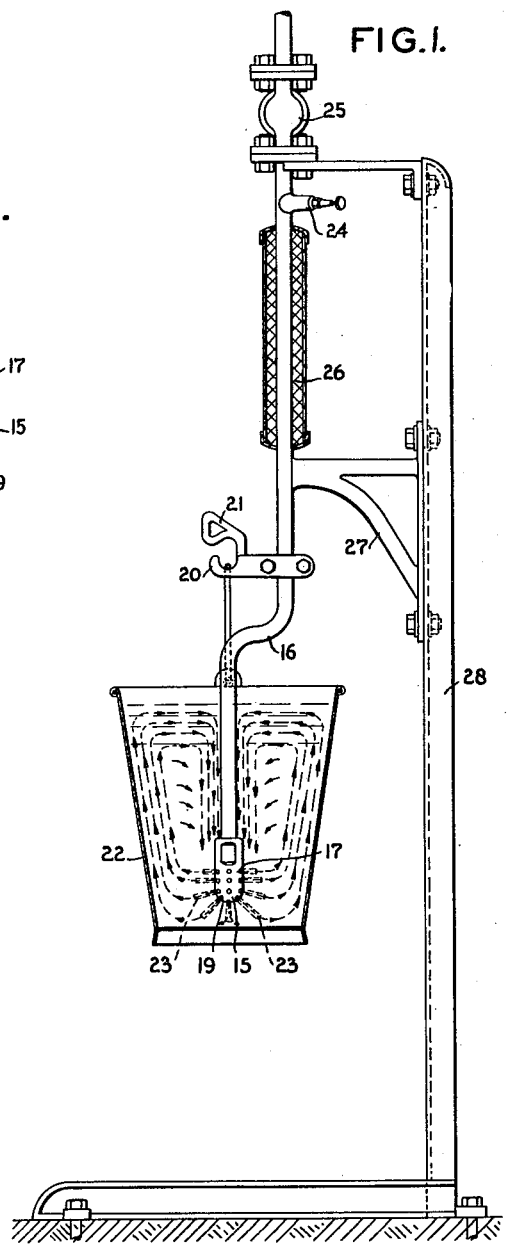
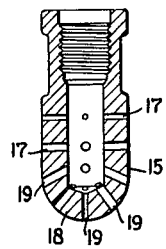
INVENTOR:
Mark BOERSTRA Patented Sept. 5, 1950

2,521,334

UNITED STATES PATENT OFFICE 2,521,334

DEVICE FOR TREATING LIQUIDS AND EMULSIONS

Murk Boerstra, Ermelo, Netherlands

Application July 11, 1946, Serial No. 682,764
In the Netherlands July 6, 1940

Section 1, Public Law 690, August 8, 1946
Patent expires July 6, 1960

2 Claims. (Cl. 261—121)

My invention relates to a device for treating liquids and emulsions, more specially to the heating treatment of liquids and to preparing solutions and emulsions.

In many plants and laboratories there is a necessity of a simple device for quickly and efficiently heating some liquid in a tank or basin, such as a pail.

The object of my invention is a device for quickly and efficiently heating quantities of liquid or for making solutions of sodium carbonate, soap or starch in laundries and chemical plants or in dyeing plants for textile goods.

Another object of my invention is a device for preparing emulsions, such as cod liver oil emulsions of high quality i. e. in which the emulsion is very homogeneous, all the emulsified particles being of equal small size.

A further object of my invention is a device, which enables the creation of very particular currents in a quantity of liquid under treatment, said currents allowing a very quick and efficient treatment of the liquid.

Still another object of the invention is a very simple nozzle for supplying a gaseous medium to a quantity of liquid to be treated, said nozzle having no suction chambers for the liquid but only channels or passages for blowing the gaseous medium into the liquid.

Having these objects in view I shall now describe some embodiments of my invention, which are shown merely by way of example.

In the drawing:

Fig. 1 is an elevation, in part a section of an embodiment of the device according to my invention;

Fig. 2 is a longitudinal section of a nozzle for the device according to Figure 1.

The arrangement of the bores in the nozzle should have a regular character, such that regularly distributed currents of liquid and gaseous medium are created in the tank, when gaseous medium is blown from the nozzle member.

As may be seen from Fig. 1 the gaseous medium is first blown in a horizontal direction. A circulation is created from the nozzle member towards the wall of the tank, then upwards, then again in horizontal direction towards the centre line of the tank and thence downwardly towards the nozzle. Thus a very efficient circulation occurs.

The total cross sectional area of the radial bores preferably equals the cross sectional area of the axial bore multiplied with a factor, in which the contraction coefficient of the jets issuing from the radial bores plays a part.

A tank containing 70 gallons of water was heated in practice from 11 to 98 centigrades in eighteen minutes by means of saturated steam having a pressure of 4 atmospheres. The rise in temperature was very continuous and 110 pounds of steam were used.

The very regular and compensating forces exerted by the equally distributed steam jets eleminate undesired vibrations of the tank.

According to Figure 1 the nozzle member 15 is connected to a downwardly leading duct 16 for a gaseous medium.

The nozzle member 15 again has a cylindrical or prismatical shape. Its lower end surface 18 is dome shaped.

Besides the rows of radial bores 17 this nozzle member is provided with a series of bores 19, which are inclined to the nozzle member axis and issue in the dome shaped surface 18. These bores 19 are directed towards the bottom of the liquid container, which in this embodiment is a pail or bucket 22.

A hook 20 is adjustably mounted on the duct or conduit 16 for engagement with the bail of the pail 22. Said hook 20 may be set in such a position, that the bottom of the pail is at a proper distance from the dome-shaped end of the nozzle 15. An abutment 21 arranged on the arm carrying the hook 20 extends above the latter. In conjunction with a proper setting of the hook 20 on the conduit 16 said abutment 21 prevents the operator at the end of an operation from a careless excessive lifting of the pail to such a degree that during the removal of the pail the bottom of the latter hits the nozzle 15 with force causing a possible damage to the nozzle and/or a dangerous spilling of hot liquid.

In practice the distance between the nozzle member 15 and the bottom of the pail 22 is about 1¾".

By suitably choosing the sizes of the bores a number of effective circulation currents as indicated in the drawings may be caused, so that the entire amount of liquid and material to be dissolved therein is well stirred and heat is transferred with high efficiency.

The diameters of the radial bores preferably vary in size and decrease towards the lower end of the nozzle member.

The steam jets blowing into the liquid are marked with 23.

If some substance such as soap powder is to be dissolved this substance is well distributed by the action of the device.

The dome shaped nozzle end at the beginning of the operation penetrate favorably into the substance to be dissolved or to be emulsified, said substance then being on the bottom of the pail 22. When the gaseous medium is admitted the jets of said medium vigorously act on said substance.

The automatic air inlet valve 24 serves the same purpose as valve 6. 25 is the steam valve. At 26 the duct 16 is covered with heat insulating material. By means of a bracket 27 the duct is supported on a stander 28.

A bucket of water is heated by means of steam of about 3.5 atmospheres pressure in less than one minute from 10 to 100 centigrades.

Four pounds of sodium carbonate are dissolved completely in water in one minute's time and heated from 10 to 100 centigrades. Four pounds of shredded soap are completely dissolved and heated to 100 centigrades in four minutes. A bucket of starch is obtained in one minute. One gallon of cod liver oil emulsion is prepared in 90 seconds with steam of 6 atmospheres pressure.

Having now described my invention and the objects and features thereof, I declare that what I claim is:

1. An apparatus for treating liquids and emulsions comprising: a support, a conduit maintained on said support and arranged for connection with a supply of fluid under pressure, a discharge nozzle connected with said conduit, a hook adjustably mounted on said conduit for engagement with a holding element of a vessel capable of receiving the material to be treated and for placing the bottom of said vessel at a predetermined distance from, and symmetrically about said nozzle, and an abutment spaced from said hook and arranged for cooperation with said holding element of the vessel, said spacing being smaller than said predetermined distance whereby during a removal of said vessel the lifting movement of the bottom of said vessel towards said nozzle is limited.

2. In an apparatus as claimed in claim 1, said nozzle being of substantially cylindrical shape and having a dome-shaped end, the longitudinal axis of said nozzle extending substantially in vertical direction, said nozzle having a first set of discharge passages in its cylindrical portion and a second set of discharge passages in its dome-shaped end portion, the passages of said first set extending in substantially horizontal direction, the passages of said second set extending radially from the center of the curvature of said dome-shaped portion.

MURK BOERSTRA.

REFERENCES CITED

The following references are of record in the file of this patent:

UNITED STATES PATENTS

| Number | Name | Date |
| --- | --- | --- |
| 638,046 | Dobson | Nov. 28, 1899 |
| 793,786 | Helmle | July 4, 1905 |
| 1,198,519 | Bradley | Sept. 19, 1916 |
| 1,431,431 | Rutzler | Oct. 10, 1922 |
| 1,518,595 | Mauran | Dec. 9, 1924 |
| 2,241,337 | Work | May 6, 1941 |

FOREIGN PATENTS

| Number | Country | Date |
| --- | --- | --- |
| 454,246 | France | June 28, 1913 |